United States Patent [19]
Newton et al.

[11] Patent Number: 4,511,207
[45] Date of Patent: Apr. 16, 1985

[54] FIBER OPTIC DATA DISTRIBUTOR

[75] Inventors: Steven A. Newton, Menlo Park, Calif.; John E. Bowers, Milltown, N.J.

[73] Assignee: The Board of Trustees of the Leland Stanford Junior University, Stanford, Calif.

[21] Appl. No.: 416,667

[22] Filed: Sep. 10, 1982

Related U.S. Application Data

[63] Continuation-in-part of Ser. No. 323,038, Nov. 19, 1981.

[51] Int. Cl.³ .................................................. G02B 5/14
[52] U.S. Cl. .................................. 350/96.15; 250/227; 350/96.16
[58] Field of Search .................. 250/227; 350/96.15, 350/96.16, 96.19, 96.20, 96.29, 96.30

[56] References Cited

U.S. PATENT DOCUMENTS

| 3,777,149 | 12/1973 | Marcatili | 350/96.15 |
| 4,021,097 | 5/1977 | McMahon | 350/96.15 |
| 4,136,929 | 1/1979 | Suzaki | 350/96.15 |
| 4,296,319 | 10/1981 | Franks et al. | 250/227 |
| 4,342,499 | 8/1982 | Hicks, Jr. | 350/96.15 |
| 4,386,822 | 6/1983 | Bergh | 350/96.15 |

FOREIGN PATENT DOCUMENTS

| 3038048 | 10/1981 | Fed. Rep. of Germany | 350/96.15 |
| 52-24539 | 2/1977 | Japan | 350/96.15 |
| 53-91752 | 8/1978 | Japan | 350/96.15 |
| 56-11432 | 2/1981 | Japan | 350/96.16 |

OTHER PUBLICATIONS

Newton, et al., "Single Mode Fiber Recirculating Delay Line", SPIE Conference, Jan. 1982.
K. P. Jackson et al., Topical Meeting on Optical Fiber Communication, Phoenix, AZ, Apr. 1982, "Microbend Optical Fiber Tapped Delay Line".

*Primary Examiner*—John Lee
*Attorney, Agent, or Firm*—Knobbe, Martens, Olson & Bear

[57] ABSTRACT

A fiber optic data distributor utilizes a one-by-n single mode optical fiber directional coupler to distribute data from a single fiber to a plurality of separate fibers. The separate fibers may supply data from a central processing unit to peripheral units, which may also input data to the separate fibers for transmission to the central processing unit.

14 Claims, 20 Drawing Figures

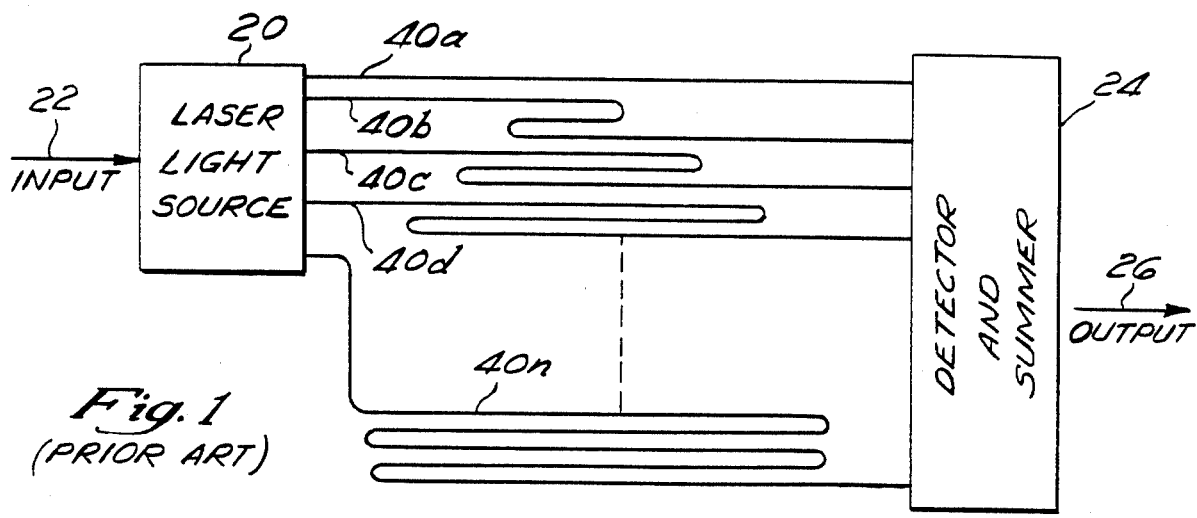
Fig. 1 (PRIOR ART)
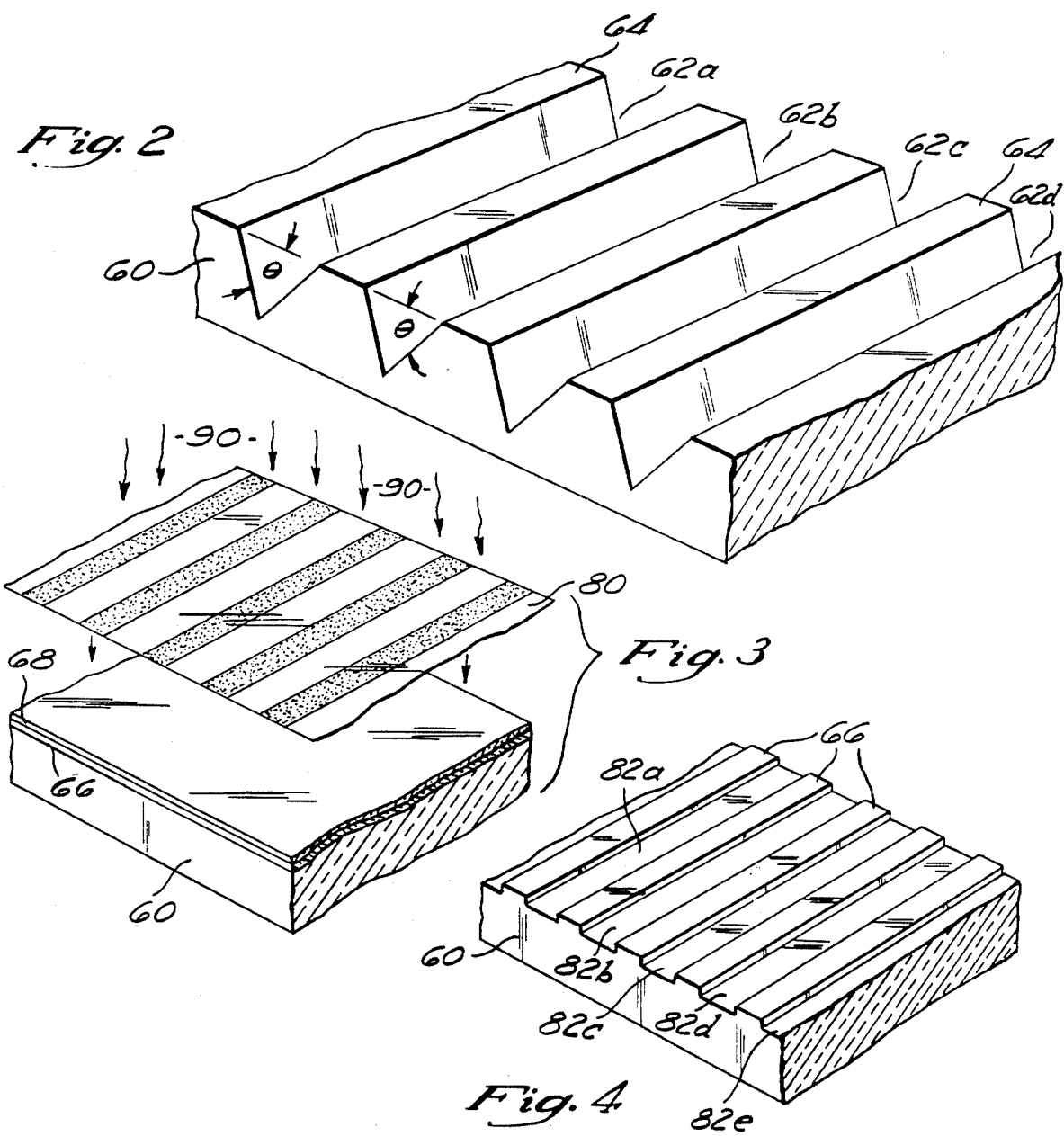
Fig. 2
Fig. 3
Fig. 4

FIBER OPTIC DATA DISTRIBUTOR

BACKGROUND OF THE INVENTION

This application is a continuation-in-part of applicant's prior copending application Ser. No. 323,038, filed Nov. 19, 1981 for Tapped Optical Fiber Delay Line.

This invention relates generally to data distribution systems and particularly to fiber optic data distribution systems.

Realization of the full potential of single mode fiber optic systems requires an efficient means of transferring at least part of the power in a single fiber to a number of other fibers at a given location. Existing four-port, two-fiber, single mode fiber optic directional couplers operate via the evanescent field coupling that occurs if the two fiber cores are sufficiently close to one another. Part of the fiber cladding must be removed in order to attain the close proximity between the fiber cores necessary for evanescent field coupling to occur. Presently, both chemical etching and mechanical polishing are used for removing part of the fiber cladding.

The chemical etching method has previously been used to fabricate multi-fiber single mode directional couplers. Braided fibers were placed within a bottle and etched with acid to remove a portion of the fiber cladding, and the fibers were sealed in index matching liquid once the desired coupling was obtained. The chemical etching method for producing multi-fiber single mode directional couplers is not completely satisfactory because the resulting coupler is polarization, dependent, not adjustable, relatively fragile, and the coupling efficiency may change with time.

In communication and control systems, delay lines are used to store signals for discreet periods, and to supply signals at output points at the end of the periods. The period between the time the signal is input and the time the signal is output is called the delay time. A tapped delay line is a variation in which the signal is supplied at several different output points, the distance between successive output points being that distance which will provide a delay time equal to the period of the fundamental frequency of the device. Tapped delay line applications include use in correlating and convoluting devices.

If an input signal which varies as some function of time is supplied to the input of the tapped delay line, the tapped delay line may be used to filter selected frequencies from the input signal. By summing the outputs of the tapped delay line, the device will attenuate any input signal content other than of the fundamental frequency and the harmonics of the fundamental.

For example, by making the period between the several output points five microseconds, a fundamental frequency having a five microsecond period will be provided at the summed output, along with the various harmonics of that fundamental frequency. For the five microsecond period, the fundamental frequency would be 200 KHz. When a tapped delay line is used to pass some frequencies and reject others, it is acting as a transversal filter.

There are three basic types of delay lines which may act as transversal filters. The first type comprises a group of devices utilizing wave phenomena in which waves may reinforce to cause the device to act as a transversal filter. The second type utilizes a considerable length of transmission medium with the signal being removed at taps which are separated by equal lengths of the transmission medium. The removed signals are summed to provide the desired system output. The third type of system recirculates the signal to allow the desired fundamental and harmonic frequencies to reinforce themselves, with the resulting output being in effect already summed by the recirculating action.

Many of the devices utilizing wave phenomena to obtain a similar output, use coaxial cables or acoustic wave guides for the transmission and summation of signals. The time delay in these devices is produced because of the time a signal takes to travel through the delay line from the input end to the output end. Portions of the signal will be reflected and will propagate from the output end back to the input end, where they are reflected to the output end again. Where an input function is continuously supplied, these devices will reinforce the signal at some fundamental frequency and that frequency's harmonics, while attenuating all other frequencies, and will provide at the output end a signal comprising the fundamental and harmonic frequency content of the input signal.

The coaxial cable delay line is the most common of these devices, and microwave signals may be stored in coaxial cables for some period of time. The main disadvantage of coaxial cables is that they have a fairly limited bandwidth, making coaxial cables useless, both at high frequencies and with short pulses.

At frequencies above 100 MHz, a coaxial cable is subject to severe losses; and high frequencies will thus not be transmitted accurately. In addition, if the pulse being transmitted is of extremely short duration, e.g., one nanosecond, it will be degraded and spread out rather than remaining sharp.

Coaxial cable is also susceptible to electromagnetic interference, particularly when the frequencies being transmitted are relatively high. Finally, fairly long lengths of coaxial cable may be necessary to allow the device to function as a transversal filter at lower frequencies; and such devices are quite bulky and also fairly expensive.

Another type of device utilizing wave phenomena is the acoustic delay line device. There are two types of acoustic delay lines: bulk-wave devices, and surface-wave devices. Bulk-wave devices use the principle of compression and in rarefaction of the bulk material, and have input and output transducers at the ends of the bulk material. Bulk-wave devices, unfortunately, require large bias voltages and thus present a heat dissipation problem, so that only pulsed operation of bulk-wave devices is feasible.

Surface-wave devices operate with acoustic surface waves, and utilize charge carriers in a thin film of silicon placed adjacent to an insulating piezoelectric crystal. Surface acoustic wave devices operating at UHF frequencies have been developed and operate with multiple taps installed in the transmission medium. The main disadvantage of such devices is that their upper operational frequency limit is approximately one GHz, and it is desirable to have a transversal filter which is operable at higher frequencies. Therefore, it can be seen that devices utilizing wave phenomena are not very satisfactory when used as transversal filters at high frequencies.

Tapped delay lines having a number of taps at different lengths of the transmission medium are generally of two types: electrical, and optical fiber. The electric tapped delay line is simply a long segment of wire with outputs at multiple points along the wire. The fundamental frequency of such a tapped delay line is selected by a uniform length of wire between outputs, the time an electrical impluse takes to travel from one output to the next, such output being the period of the fundamental frequency. Such devices are fairly bulky and expensive, since the requirement of having hundreds or possibly even thousands of outputs means that fairly large lengths of wire will be needed. Such devices also have a severe limitation in their operational bandwidth, and are generally not operable a high frequencies or in an environment having a not insubstantial amount of electromagnetic interference.

The optical fiber type of tapped delay line has significant advantages in that it is not susceptible to elctromagnetic interference, is operable at relatively high frequencies; and optical fiber is substantially less bulky than wire. However, in order to obtain performance over a wide range of frequencies from existing optical fiber devices, hundreds or even thousands of optical taps must be utilized. This can be done with current technology by fabricating discrete couplers at each tapping point. Such a system is not really feasible in that it is extremely difficult to construct, quite expensive, and would be difficult to accomplish without lowering the signal level substantially. However, the concept of sampling the signals in an optical fiber at discrete intervals is an important one, and will be utilized by the present invention.

Another type of optical fiber tapped delay line is one which uses multiple segments of optical fiber, each segment being a standard length longer than the preceding segment. The standard length is the length through which light travels in one period of the fundamental frequency. The signal being analyzed is introduced into each segment simultaneously, and the outputs of each of the segments is summed to produce an output signal comprising the fundamental and harmonic frequency content of the input signal.

While this device accomplishes the desired result, it presents the substantial problem of necessitating an input signal to be simultaneously supplied to hundreds or even thousands of optical fiber segments. Such a device would be difficult to construct, and would also be somewhat bulky.

Each of the above optical fiber devices also presents the disadvantage of not being able to change the tap weighting dynamically without extensive modifications to the device. In other words, once such a device is constructed, the relative weighting of various outputs which are to be summed may not be changed in order to tailer the output signal of the device.

The second type of tapped delay line is a recirculating memory type device, such as that described in co-pending patent application Ser. No. 314,473, filed Oct. 23, 1981, entitled "Splice Free Fiber Optic Recirculating Memory," and assigned to the assignee of the present invention (now U.S. Pat. No. 4,473,270). Such device operates in a way quite similar to the wave phenomena devices described above. A signal recirculates through a fiber optic loop in the recirculating memory devices, with the output of the device being a summed signal coprising the system-set fundamental and harmonic frequency content of the input signal, with all other frequencies being attenuated. The fundamental frequency has a period equal to the time taken for a signal to make one circulation through the loop.

Such devices have the advantages of being operable at high frequencies, being unaffected by electromagnetic interference, and being fairly compact. However, when used as a transversal filter, such devices have several disadvantages. First, in order to obtain an ouput signal of a usable level, recirculating memory devices can provide only a fairly limited number of circulations before the signal level drops below the usable level. This is a particular problem since it is desirable to have hundreds or even thousands of points at which the signal is taken and summed in order to obtain an accurate and sharply defined passband. A second substantial disadvantage of such devices is that there is no way to change the dynamic weighting of the output signals taken at various points before they are summed, since the summing is done within the device. Finally, since recirculating memory devices have fixed loop lengths, there is a limitation on the length of signals input to such devices.

Therefore, there is a need for a device which has a large number of discreet taps with each tap being capable of removing the signal at some discreet point in the delay line. Each of the tapped outputs should be discrete, so that dynamic weighting of the outputs may be accomplished in order to tailor the resulting output of the system when the signals are summed. For example, by weighting the various output signals, a more nearly rectangular band for a transversal filter may then be obtained.

In data distribution systems, such as computer systems, it is generally advantageous to transmit the maximum amount of data in a given time interval. Previous data distribution systems are incapable of transmitting information at speeds which fiber optic systems provide. In a fiber optics system, the signal travels at the velocity of light in the optical fiber medium. The carrier frequencies at which fiber optics systems operate permit the use of modulation or signal frequencies much greater than those which the microwave signals used in coaxial cables permit.

SUMMARY OF THE INVENTION

The invention provides a tapped optical fiber delay line utilizing a large number of revolutions of single mode optical fiber with a portion of each revolution glued into the next of a number of parallel v-grooves in a plate or chip. If the device is to be used as a transversal filter, the length of each revolution is identical, with that length determining the fundamental frequency of the device. A portion of the cladding on each revolution of the optical fiber mounted on the plate or chip is removed along a lateral line normal to the revolutions of fiber in the v-grooves, thereby simultaneously creating a tap in each revolution where the fiber crosses the line. Each of the multiplicity of taps will be separated by a length equal to the length of one revolution in the transversal filter application.

By removing only a small portion of the cladding at each tap location, only a small portion of the light will be removed from the fiber at each tap. The light at each tap is removed or detected in one of two ways. In the preferred embodiment, photosensitive semiconductor devices are used at each tap, so that the signal at each tap may be individually detected. The amplitude of the output of each photodetector may then be controlled by a field effect transistor (FET) to dynamically change the weighting of the various taps. By changing the weighting of the various taps, the frequency response of the system may be tailored. By changing which taps are used, the fundamental frequency of the device may be varied. For example, if every other tap is weighted at zero, the fundamental frequency is halved. When an input signal is supplied to one end of the fiber and the outputs of the dynamically controlled photosensors are summed together, the resulting system output will be a signal comprising the fundamental and harmonic frequency content of the input signal.

A second technique of detecting the light at each tap involves using a multiplicity of segments of optical fiber instead of the photodetectors, and, in effect, constructing a coupler at each tap location. The outputs of these fibers may then be weighted, if desired, and summed to produce the output signal.

The optical fibers are preferably mounted so that the distances between successive revolutions of the fibers at the point where they are to be tapped is identical. In addition, the level at which the fibers are mounted at the location where they are to be tapped coincides with the lateral line normal to the v-grooves, since in the tapping process a portion of the cladding is removed by lapping the surface of the fibers. Since the lapping operation simultaneously removes a portion of the cladding on each revolution of the fibers wound around the core, the fibers are mounted at the same level so that an identical amount of cladding is removed from each revolution of the fibers, thus creating a number of identical taps.

In order to perform the lapping operation on the portions of each revolution of fiber which are to have some of the cladding removed, that portion of the fiber should be fixedly mounted. The preferred way to do this is by utilizing silicon chips having grooves etched into them. Since it is possible to etch the silicon chips by using photolithographic methods and to obtain a high degree of accuracy in the etching operation, such a method is the preferred embodiment. The use of grooves etched into a silicon chip to orient the revolutions of optical fiber is also useful in that it allows for highly accurate placement of either the photosensitive elements or the optical fiber coupler leads in a way ensuring they are correctly oriented in order to insure proper operation of the taps.

This device possesses several advantages over the other devices described above. Since it is a fiber optic device, it is operable at very high frequencies, unlike the wave phenomena devices and the other non-optical devices described above. Since the optical frequencies may be of the order of $10^{14}$ Hz, frequencies several orders of magnitude higher than 1 GHz may be modulated onto the optical carrier frequencies used. By using single mode optical fiber as the delay medium, high frequency information may be transmitted without suffering significant signal degradation.

The present invention has an advantage over all of the other devices described above in that it is possible to obtain a very large number of taps, i.e., hundreds or thousands of taps, from a single relatively compact device, and at a relatively modest cost of construction. Since all of the taps are formed in a single operation, a large number of taps having uniform characteristics may be simultaneously manufactured, a requirement for accurate operation of the device.

Another significant advantage of the present invention is that it is able to change the weighting of the various taps dynamically. As mentioned above, this is a highly desirable characteristic since a relatively accurate tailoring of the frequency response can be obtained. The device also has several advantages since it embodies single mode optical fiber. Because of the low dispersion characteristics of single mode fiber, signals with high frequency content may be transmitted accurately by the device. Also, since evanescent field coupling is utilized (as opposed to lapping into the core of the fiber), the present invention provides a more efficient, stable, and controllable tapping of the optical fiber, and thus a greater degree of control over the operating characteristics of the device.

The invention provides a data distribution system which overcomes the disadvantages of prior systems. A fiber optic data distribution system outputs data at a plurality of optical taps in a strand of optical fiber. A central processing unit (CPU) may utilize the invention to supply data to peripheral equipment used in conjunction with the CPU. One embodiment of the invention permits two-way transmission of data between the CPU and peripherals and also permits data transmission between peripherals. The time required for transmitting information via the fiber optic data distribution system is much shorter than the time required for transmitting the same information on prior data distribution systems because of the high velocity and high frequency carrier signals used in fiber optics systems.

These and other advantages of the present invention are best understood through reference to the drawings, in which:

FIG. 1 shows a prior art optical fiber delay line transversal filter;

FIG. 2 is a perspective view of a portion of the grooved chip used to properly align the optical fiber windings;

FIG. 3 is a perspective view illustrating the photolithographic technique utilized to achieve precise alignment of the v-grooves;

FIG. 4 is a perspective view of a portion of the silicon wafer ready to be etched;

Figure 13:
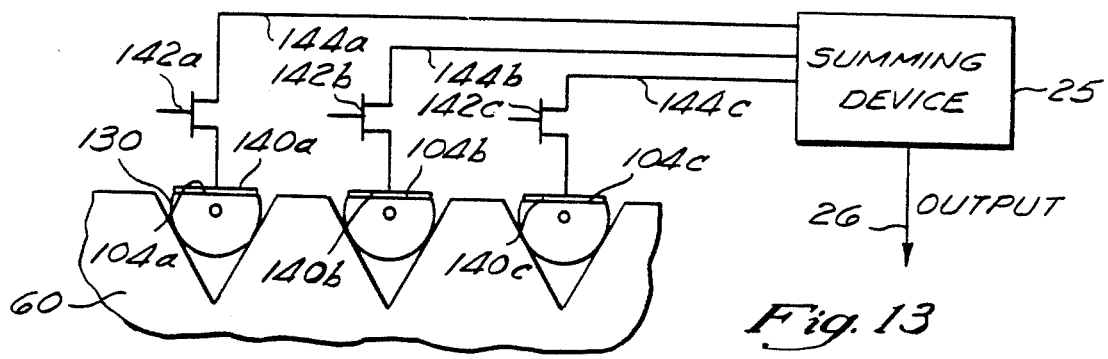
Figure 14:
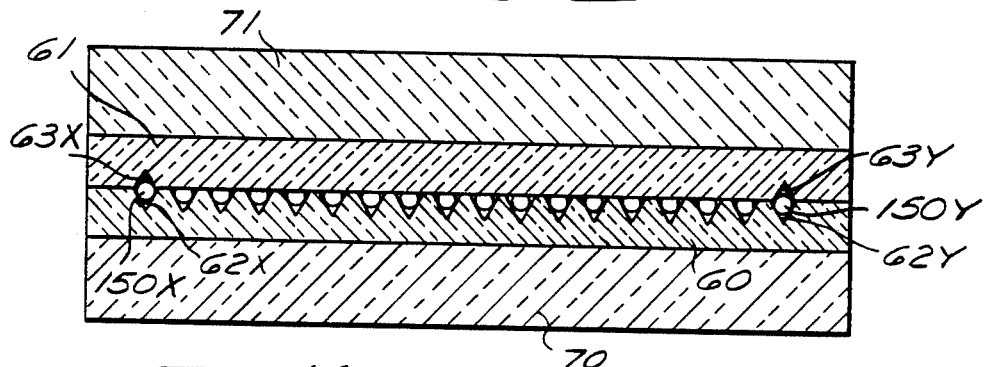
Figure 15:
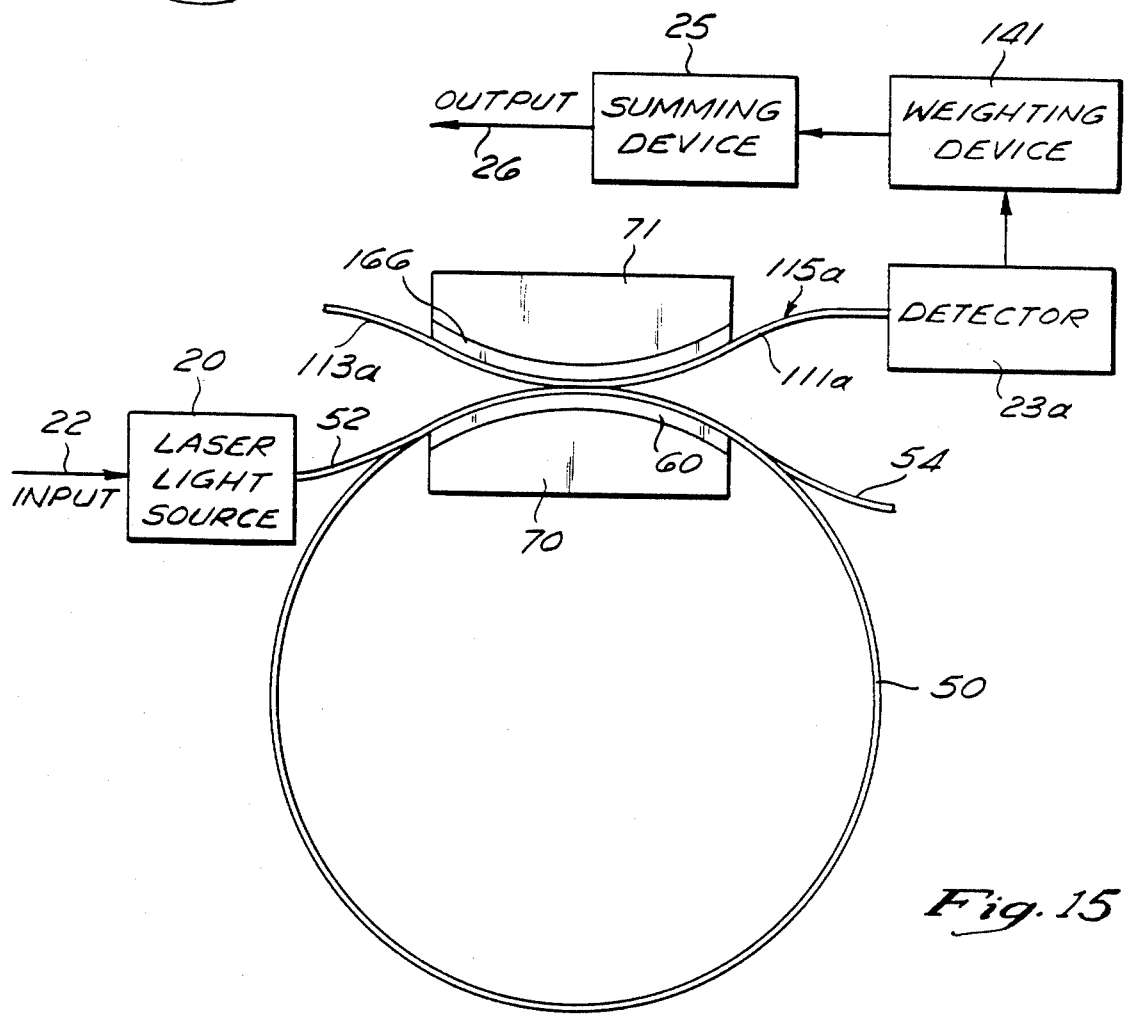
Figure 16:
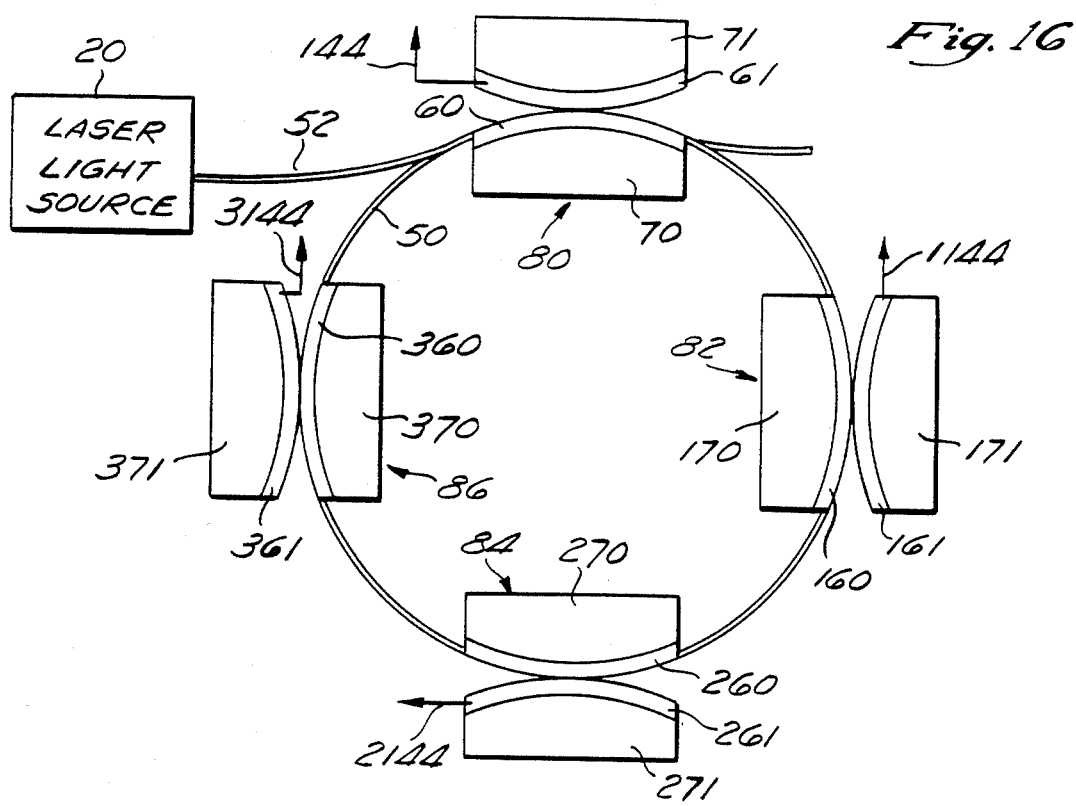
Figure 17:
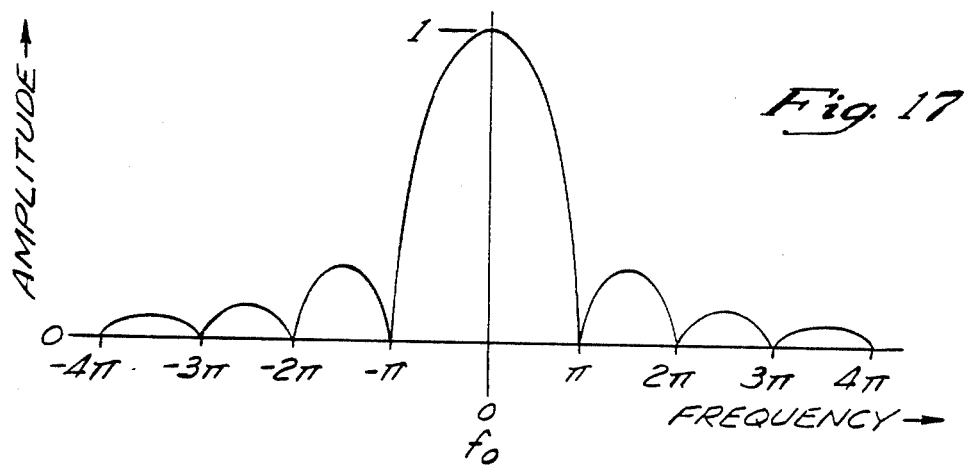
Figure 18:
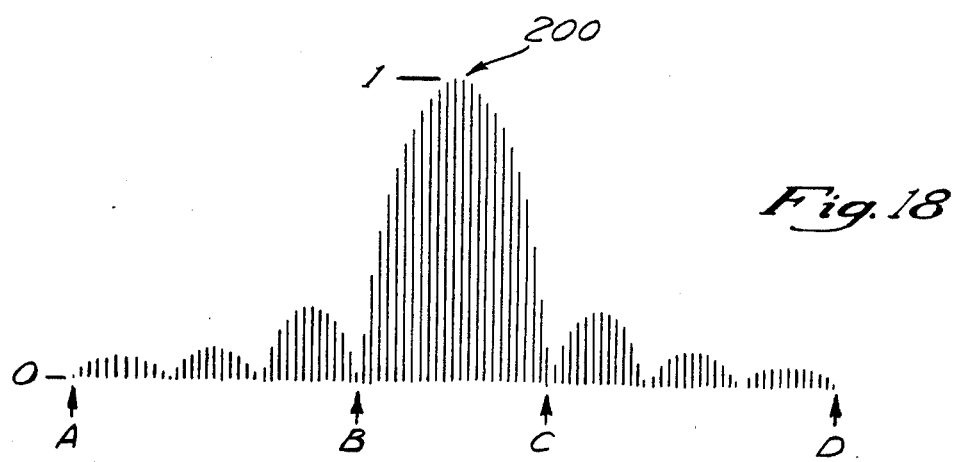
Figure 19:
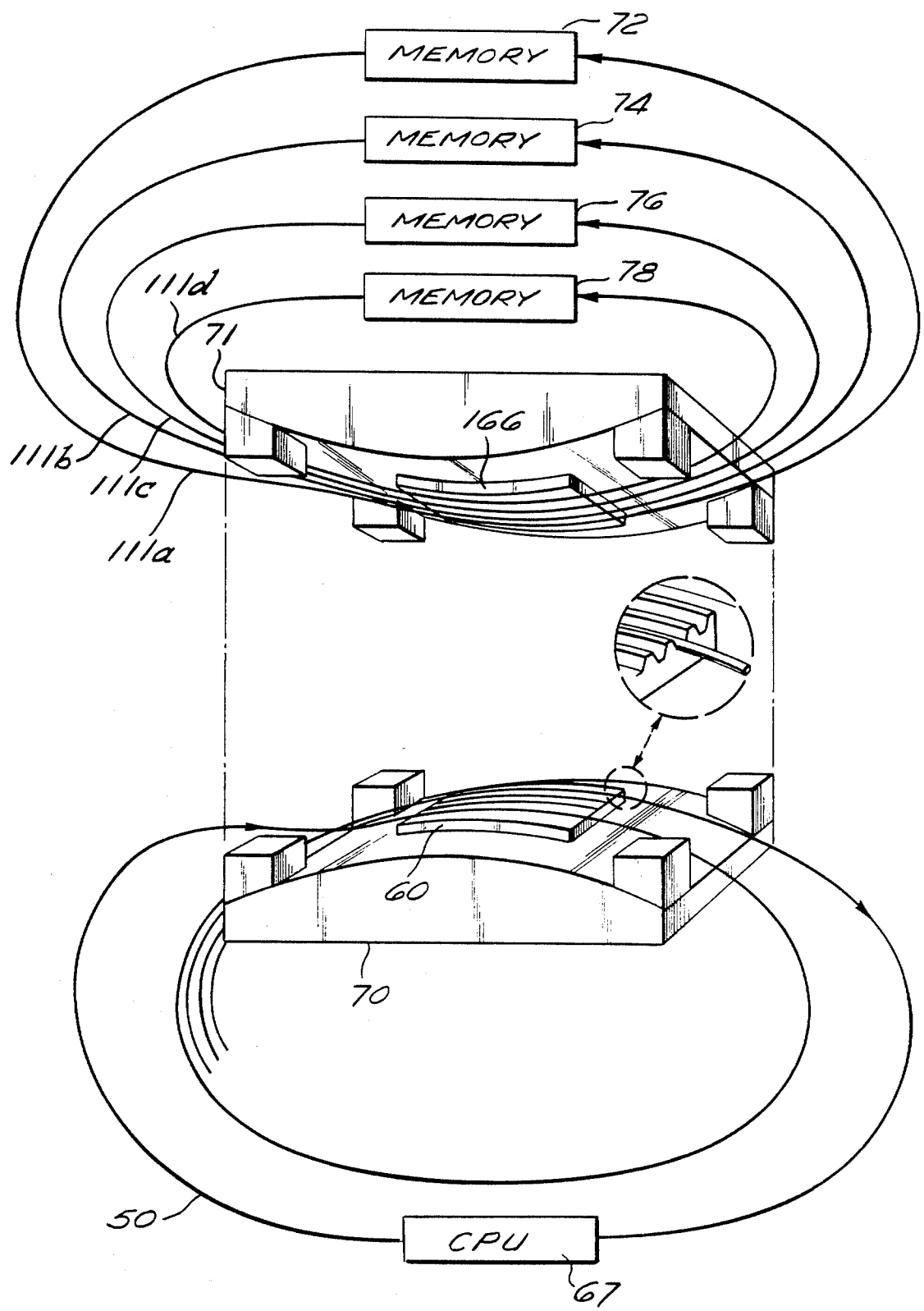

FIG. 13 schematically shows the photodetector apparatus of the preferred embodiment for detecting light in several windings of optical fiber, weighting the output of each photodetector, and summing the outputs;

FIG. 14 is a cross-sectional view of the apparatus used to construct the preferred embodiment of FIG. 13, illustrating the technique used for alignment;

FIG. 15 illustrates an alternative embodiment utilizing the simultaneous manufacture of multiple couplers, which are used to detect light from the various taps in the tapped delay line;

FIG. 16 illustrates a technique using the preferred embodiment of the invention for the detection of higher frequency functions;

FIG. 17 is a weighting function used to produce a rectangular passband transversal filter;

FIG. 18 is a graph of the weighting of a number of taps using the weighting function of FIG. 17; and FIG. 19 is an exploded perspective view showing the couplers of FIG. 15 in a data distribution system.

DETAILED DESCRIPTION OF THE PREFERRED EMBODIMENT

The basic concept of the tapped delay line is to sample a single simultaneously at a multiplicity of points in the transmission medium the signal is traveling in. When the tapped delay line is acting as a transversal filter, all of the samples were taken at multiplicity points on the transmission medium. The distance between these points determines the fundamental frequency of the device. All of the samples are then summed to provide a signal comprising the system-set fundamental and harmonic frequency content of the input signal. All other frequencies will be attenuated by the device. Generally, the greater the number of taps, or points at which the input signal is sampled, the more accurate will be the desired filter characteristics.

Fiber optic devices intended for use as filters have had one significant problem: it has been quite difficult to get a fairly large number of taps at which samples of the signal traveling in the fiber may be taken. The only fiber optical device which has succeeded in providing a fairly high number of taps is the device shown in FIG. 1, and it is not a true tapped delay line since it utilizes a large number of fibers of different length rather than taps. An input signal 22 is modulated onto a light signal provided by a laser light source 20. The output signals are supplied to n optical fibers, which are numbered 40a, 40b, 40c, ..., 40n. Each succeeding fiber is longer than the previous fiber by a distance L, where L is the length of fiber that will provide a time delay equal to the period of the desired fundamental frequency of the transversal filter. The output ends of each of these fibers 40a, 40b, 40c, ..., 40n are supplied to a detector and summer 24, which sums all of the outputs from the fibers 40 and provides an output 26, which comprises the system-set fundamental and harmonic frequency content of the input signal 22.

The device shown in FIG. 1 is bulky and inconvenient, since it requires one optical fiber segment for each of the taps desired. The present invention overcomes the disadvantages of the device shown in FIG. 1 in that it can have a fairly large number of taps which are constructed simultaneously from a single length of optical fiber, thus minimizing the time, expense, and difficulty of construction of the tapped delay line.

Figure 5:
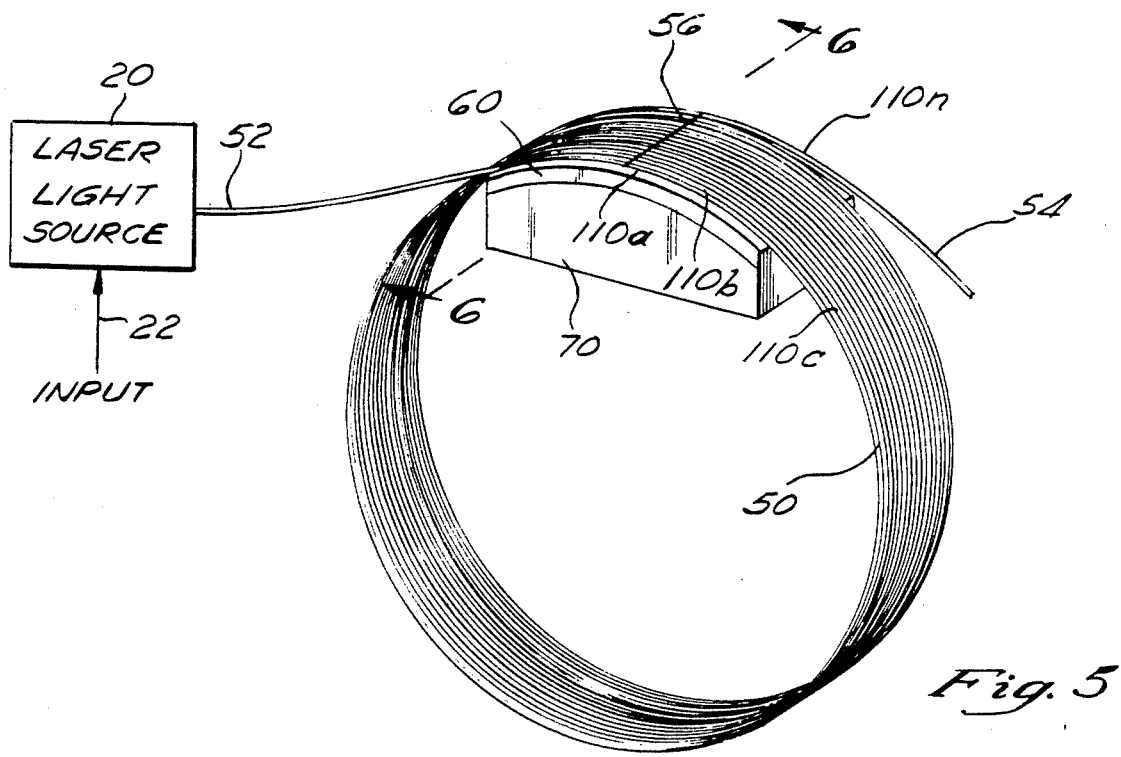
FIG. 5 shows the input stage of the preferred embodiment of the present invention.

The basic concept of the invention is illustrated best in FIG. 5, which shows the input side of the invention. A single segment of optical fiber 50 is used, beginning at the input end 52, which is supplied with a light input signal from a laser light source 20, and ending at an output end 54. The optical fiber 50 is wound around a chip 60 with v-grooves to receive the optical fiber 50. The optical fiber 50 is wound around the chip 60 n times, with the portion of the fiber 50 on the chip at the first winding being 110a, the portion of the fiber 50 mounted on the chip in the second winding being 110b, and so on. At the lateral line 56 normal to the fiber segment axes, taps are constructed so that each revolution of the optical fiber 50 is tapped at the lateral line 56. Before a description of the construction of the taps on the optical fiber 50, it is necessary to describe the construction of the chip 60 and the manner by which the optical fiber 50 is laid in the v-grooves in the chip 60.

In FIG. 2, a portion of the chip 60 with the completed v-grooves 62a, 62b, ..., 62n is shown. It is desirable that each of these v-grooves 62 be identical in width and depth, since the fibers are to be coplanar because the taps in the fibers in these v-grooves will be constructed simultaneously. If the v-grooves 62 are identical, the taps on the fibers will have uniform characteristics.

Because of this need for great precision in the construction of the v-grooves 62, the preferred material for the chip 60 is silicon, which can be etched by photolithographic techniques, rather than some other material in which grooves are machined. The type of silicon used is commercially available 100 oriented silicon, because when the surface of this type of silicon is subjected to an etching solution, the surface dissolved at an angle theta, as shown in FIG. 2. For 100 oriented silicon the angle theta is 54.74 degrees.

Therefore, in order to make the v-grooves shown in FIG. 2 in the silicon chip 60, the following photolithographic method may be used. The chip is first heated so that a very thin oxide layer 66 will cover the chip 60, as shown in FIG. 3. The chip is then coated with a photosensitive coating 68 known as photoresist. A mask 80 is then placed over the chip, and the top of the chip is exposed to ultraviolet light 90. For the mask 80 shown in FIG. 3, positive-acting photoresist is used, so the portions of the photoresist 68 under the opaque sections of the mask 80 will be left to perform the masking function.

The next step is to etch away the photoresist 68 and oxide layer 66 which were under the non-opaque portions of the mask by using a buffered hydrochloric acid solution. The remaining photoresist is then stripped by use of a special solvent, and the chip 60 will appear as it does in FIG. 4, covered by a mask of the oxide layer 66. The silicon chip 60 is then placed into an anisotropic etching solution, commonly potassium hydroxide solution. The portions of the chip 60 not covered by the oxide layer 66 will then be dissolved by the etching solution at an angle of 54.74 degrees from the surface 64 of the chip 60. The etch will develop as a flat-bottom groove until the two angled planes intersect and a true v-groove is formed, as shown in FIG. 2. This photolithographic technique is well-known in the art, and has been used extensively in the manufacture of semiconductors.

The size of the groove 62 to be etched in the silicon chip 60 of course depends on the optical fiber being used. There are two widely-used types of single mode optical fiber, one manufactured by ITT which has a diameter of about 80 microns (400 microns including the plastic jacket), and a second brand of fiber manufactured by Corning which is 125 microns in diameter (135 microns with the lacquer jacket). Which of these or other fibers is used depends on the wavelength of the light to be used; if visible light is to be used, the ITT fiber is acceptable since it is single mode at visible light wavelengths (longer than green), and if infrared light is to be used, the Corning fiber is acceptable since it is single mode at infrared wavelengths.

There are at least four different techniques for constructing optical taps using v-grooves in the silicon chip 60. Through extensive experimentation, it has been determined that one of these techniques is superior to the other three, and that technique will be described first.

Referring now to FIG. 5, in order to construct an optical tap, it is desirable to have an optical fiber surface to be tapped mounted in a curved configuration so that a flat portion of the optical fiber 50 may be lapped to provide a tap of the light traveling within the fiber 50. Therefore, the silicon chip 60 is mounted on a block of quartz 70 which has a curved upper surface. It has been found that a silicon chip of standard thickness (0.25 millimeter) and about three-centimeter length can be bent without breaking around a twelve-inch radius. An adhesive substance such as wax is used to hold the silicon chip 60 on the quartz block 70 in the curved configuration shown in FIG. 5. The optical fiber 50 may now be mounted on silicon chip 60.

Before the optical fiber 50 can be mounted in the v-grooves in the silicon chip 60, the portions of the optical fiber 50 which are to be mounted in the v-grooves preferably have the protective jacket removed. The ITT fiber has a plastic jacket which may be removed by dipping it in sulfuric acid. The resiliency of the plastic jacket prevents precision in the lapping operation, so it should be removed. The Corning fiber has a lacquer jacket which may be removed by dipping it in acetone. Since the lacquer jacket is more solid than the plastic jacket, its removal is preferential rather than mandatory.

Figure 6:
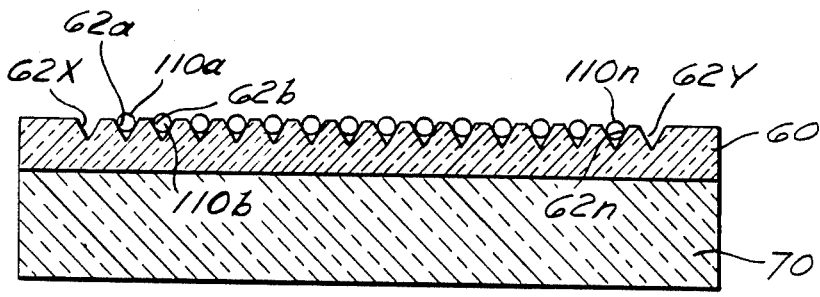
FIG. 6 is a cross-sectional view of the device shown in FIG. 5, showing the windings of optical fiber aligned in the v-grooves.
Figure 7:
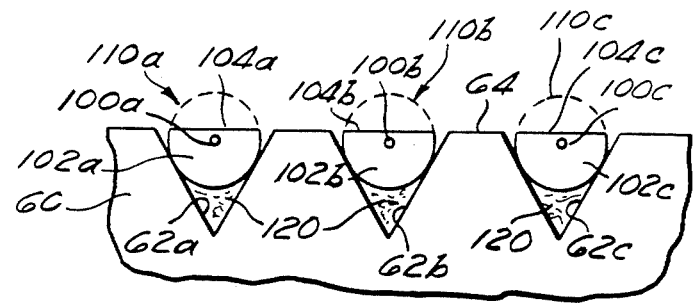
FIG. 7 is an enlarged view of a portion of FIG. 6 showing the optical fibers mounted in the v-grooves and lapped.

The installation of the fiber 50 in the v-grooves of the silicon chip 60 is best shown in FIGS. 6 and 7. A portion of the optical fiber 50 near the input end 52 of the fiber 50 is mounted in the second v-groove 62a of the silicon chip 60. It should be noted that there is a first v-groove 62x, as shown in FIG. 6, which is not used to receive the optical fiber 50, but rather for alignment purposes. The portion of the optical fiber 50 which is to be placed in the v-groove 62a is numbered 110a, and before it is mounted in the v-groove 62a, an adhesive substance 120 is placed in the bottom of the v-groove 62a. Therefore, when the portion 110a of the optical fiber 50 is placed in the v-groove 62a and the optical fiber 50 bottoms out against the sides of the v-groove 62a, it will be permanently retained there by the adhesive 120.

Following the placement of portion 110a of the optical fiber 50 in the first v-groove 62a, a length L of the optical fiber is left between the center of the portion 110a and the center of the second portion 110b of the optical fiber 50, which is to be mounted in the second v-groove 62b (FIG. 5). This length L, as defined above, is the length of optical fiber which will provide a delay time equal to the period of the desired fundamental frequency of the device. Therefore, it can be seen that the optical fiber 50 is wound around the silicon chip 60 so that upon each successive revolution it is fitted into the next succeeding v-groove, and secured by the adhesive 120, as shown in FIG. 5. When the last portion 110n of the optical fiber 50 has been fitted into the last v-groove 62n of the silicon chip 60, the optical fiber 50 terminates at end 54, as shown in FIG. 5.

Figure 8:
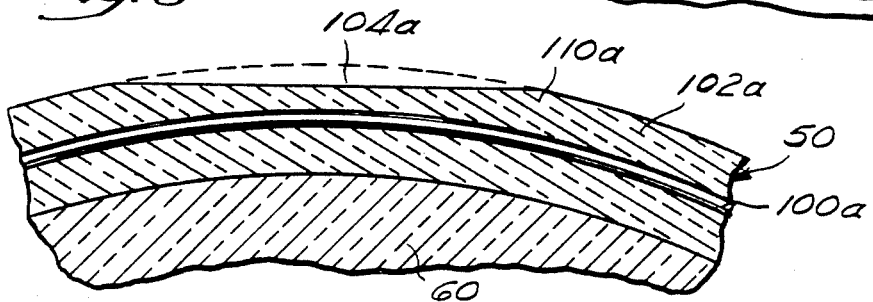
FIG. 8 is a cross-sectional view of the first winding of optical fiber mounted in the v-grooves illustrating how the fiber is lapped.

The next step is to lap the upper surface of the portions 10 of the optical fiber 50 at the lateral line 56, the portions 110 of the optical fiber 50 being mounted in the silicon chip 60. The lapping operation will remove a portion of the cladding 102, as best shown in FIG. 7. It is important to note that not all of the cladding material 102 around the core 100 of the optical fiber 50 is to be removed. The distance between the core 100 and the lapped surface 104 of the fiber 50 depends on the amount of light which is to be removed from the fiber at each tap. The closer the lapped surface 104 is to the core 100 of the fiber 50, the more light is extracted from the fiber 50 at the tap. Since it is desirable for our application to have a fairly high number of taps, only a small amount of light will be removed at each tap. Therefore, between approximately five and ten microns of cladding 102 will be left between the lapped surface 104 and the core 100 of the fiber 50. A longitudinal cross sectional view of the lapped optical fiber is shown in FIG. 8.

Figure 9:
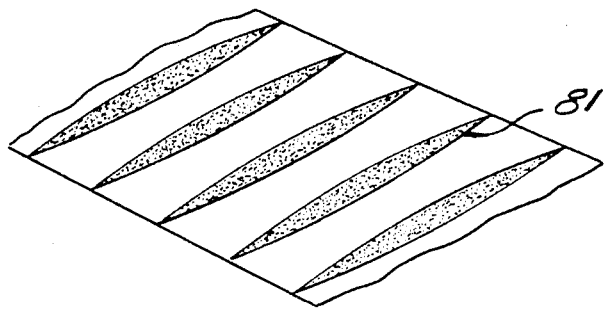
FIG. 9 is a perspective view of a mask used in the photolithographic process for an alternative embodiment.
Figure 10:
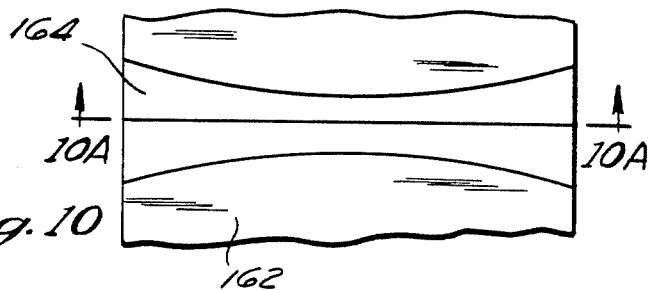
FIG. 10 is a top view of a v-groove in a wafer manufactured using the mask shown in FIG. 9.
Figure 10A:
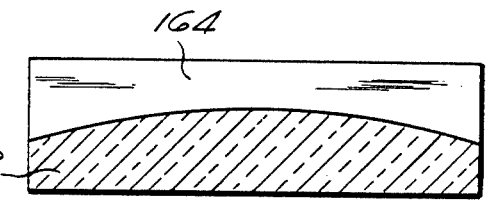
FIG. 10A is a cross-sectional view of the v-groove shown in FIG. 10.

Before proceeding to the description of the detection of light emitted from the optical tap, the three alternative methods for manufacturing the tap itself will be described. First, instead of using a quartz block 70 with a curved surface, the silicon chip may have curved v-grooves cut into it, as shown in FIGS. 10 and 10A. In order to have such curved v-grooves, a mask 81 such as that shown in FIG. 9 is used. Because the silicon chip will be etched at a 54.74 degree angle from the surface of the chip, a wider v-groove will then be cut at the edges of the chips tapering to the normal width in the center of the chip 162, and since the depth of the v-groove is proportionate to the width of the v-groove, it will be deeper at the ends than it will be in the center, thus resulting in the curved v-groove 164 shown in FIGS. 10 and 10A.

While this technique somewhat simplifies the construction of the curved v-grooves necessary for the optical taps, it does have several problems. First, the photolithographic technique utilizes very small steps rather than a uniform curve in the preparation of the mask 81. This limitation is caused by the fact that the mask 81 is prepared in digital steps instead of in an analog curve. Therefore, the resulting v-groove 164 will also contain these very small steps, and this leads to the possibility of microbending losses when the optical fiber 50 is installed into the v-grooves 164. Another problem is that the silicon wafer 60 used is fairly thin, and if the v-grooves have too much depth, they could substantially weaken the strength of the silicon wafer. Thicker silicon chips are generally not of the uniform thickness required for the precise mounting of the fiber 50. Finally, since the deeper portions of the v-grooves 164 at the edges of the silicon chip 60 are formed by making the v-grooves 164 wider between v-grooves 164 at the edges, the minimum distance must necessarily be greater for this embodiment, thus making the overall size of the tapped delay line larger. Because of these problems, the first technique described above is preferred over the curved v-groove technique.

Figure 11:
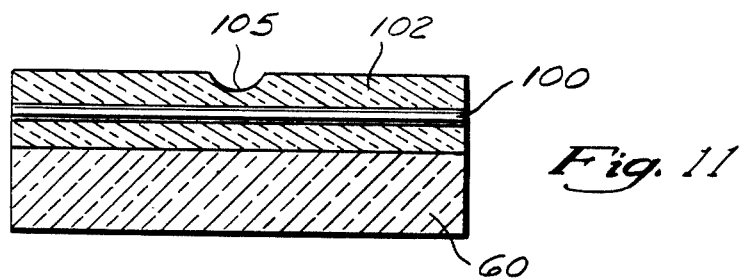
FIG. 11 is a cross-sectional view of one of the windings of optical fiber in a v-groove illustrating an alternative embodiment utilizing rotary wrapping.

A second possible method of constructing the optical taps in the fiber also does not require bending of the silicon chip 60. This method, shown in FIG. 11, utilizes radial lapping techniques. A cylindrical tool (not shown) is used to lap the fiber 50, removing the curved portion 105 from the cladding 102 of the fiber 50. This does have the advantage of localizing the loss, but is is not the preferred embodiment, in part because it is not usable with both of the methods for measuring the tapped outputs described below.

Figure 12:
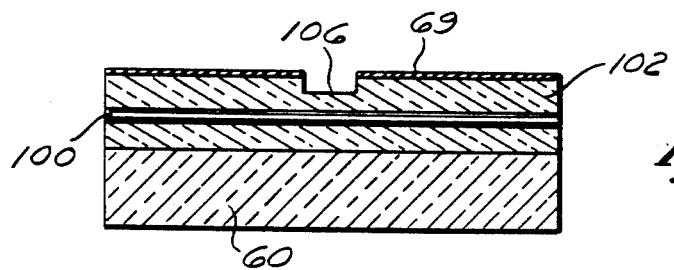
FIG. 12 is a cross-sectional view of one of the windings of optical fiber in a v-groove illustrating an alternative embodiment using a photolithographic etching process to cut into the cladding of the optical fiber.

The third alternative method for tapping portions of the fiber 50 to remove light is shown in FIG. 12. Photolithographic techniques are used with chemical or plasma etching, whereby a mask of photoresist 69 is placed on the surface of the portions of the optical fiber 50 resting in the v-grooves of the silicon chip 60. A gap is provided in the photoresist mask 69 along the line 56 (not shown in FIG. 12). Thus, when the chemical etch or plasma etch process occurs, a portion of the cladding 102 will be removed, creating an optical tap at the point 106 where the cladding is removed. This method is not the preferred embodiment because it is quite difficult to accomplish, since it requires repeatedly checking the amount of light removed by the tap while the etching process is being performed.

There are two techniques used for detecting and measuring the signal at the multiple tap locations. The first of these two techniques discussed below is the preferred embodiment, and the second technique discussed below, while not the preferred embodiment, is of great significance in that it may be used for mass production of optical coupling devices.

The first technique is schematically illustrated in FIG. 13. Three portions of the optical fiber 50 in the v-grooves are shown. The lapped surfaces of these three portions 104a, 104b, and 104c have photosensitive electronic devices 104a, 104b, and 104c, respectively, installed in a position whereby the light tapped from the fiber 50 at each tap location is measured by the photosensitive devices 140a, 140b, and 140c. The outputs of these photosensitive devices 140a, 140b, and 140c are connected to field effect transistors (FETs) 142a, 142b, and 142c, respectively. The FETs 142a, 142b, and 142c are used to weight the various taps by varying the gate potential of the FETs 142a, 142b, 142c, and they may also be used to compensate for losses occurring in the fiber 50 for taps which are nearer the end of the optical fiber 50.

The output 144a, 144b, and 144c of the FETs 142a, 142b, and 142c, respectively, as well as the outputs 144 of the other tap locations, are supplied to a summing device 25, which provides an output 26 comprising the system-set fundamental and harmonic frequency content of the input signal 22, all other frequencies being attenuated. Preferably, the photosensors 140 and the FETs 142 are manufactured on a second silicon chip 61 so that when the two chips 60, 61 are placed together as shown in FIG. 14, the tapped delay device is completed. If necessary, an index matching medium 130 such as index oil may be used between the lapped portions 104 of the optical fiber 50 and the photosensors 140, as shown in FIG. 13.

FIG. 14 shows that the two additional v-grooves 62x and 62y in the silicon chip 60, and two v-grooves 63x and 63y in the second silicon chip 61 are used for correctly mounting the two chips together. Two pins 150x and 150y fit in the corresponding pairs of v-grooves 62x and 63x, 62y and 63y, respectively, to insure proper alignment. If desired, the second silicon chip 61 may also be mounted on a quartz block 71.

FIGS. 15 and 19 illustrate the structure of a data distributor 65 formed by taking a number of segments of optical fiber 111a, 111b, 111c, . . . , 111n and mounting them in v-grooves in a second silicon chip 166 which is identical to the chip 60, and then lapping the surfaces of the optical fibers 111 as described above. The two silicon chips 60 and 166 are then placed in proximity, alignment being aided by the pins 150x and 150y shown in FIG. 14, and optical couplers are formed. These optical couplers operate on the principles described in co-pending patent application Ser. No. 300,955, filed Sept. 10, 1981, entitled "Fiber Optic Directional Coupler," and assigned to the assignee of the present invention. That co-pending patent application is hereby incorporated herein by reference. The output ends of the optical fibers 111 are then supplied to detectors 23, which supply a corresponding electrical signal to weighting devices 141, the outputs of which are summed by a summing device 25 to provide an output 26.

It is extremely significant in that by using the v-grooves and silicon chip technology, a large number of optical couplers may be simultaneously fabricated. These couplers could then be split into individual couplers, each with four ports as in the above-referenced case, and sold individually.

The present invention also utilizes the plurality of couplers to distribute data from the loops of the fiber 50 to each of the plurality of fibers 111. Referring to FIG. 19, evanescent field coupling between the loops of the fiber 50 and the individual fibers 111 serves to transfer a signal input to the fiber 50 to each of the individual fibers 111. In addition, a signal input to one of the individual fibers 111 is coupled to the corresponding coil of the fiber 50. A signal coupled to the fiber 50 from one of the individual fibers 111 may then be coupled from the fiber 50 to other individual fibers 111. For example if individual fiber 111b couples a signal to the fiber 50, then the couplers formed between the fiber 50 and individual fibers 111c and 111d will couple that signal to individual fibers 111c and 111d. If the CPU 67 outputs the same signal input thereto from the fiber 50, the signal will be coupled to the individual fiber 111a. Thus, the data distributor permits two-way transfers of data between the CPU 67 and the terminals 72, 74, 76 and 78 and permits the transfer of data from any of the terminals 72, 74, 76, and 78 to the other terminals.

A convenient method of forming the data distributor is to wrap single mode fiber 50 around the v-grooved chip 60 in the manner described with reference to FIG. 6. Similarly a single mode fiber 111 is wrapped around a v-grooved chip 166, which is substantially identical to the v-grooved chip 60. The v-grooved chip 166 is attached to a quartz block 71 similar to the quartz block 70. Severing the coils of the fiber 111 along a convenient line along the back of the quartz block 71 on which the chip 166 is mounted forms a plurality of individual fibers 111a . . . 111n with each individual fiber 111a . . . 111n being in a corresponding v-groove of the chip 166.

If the total number of fibers 111 is n, then the data distributor 65 functions as a one-by-n directional coupler by coupling data from the single fiber 50 to each of the fibers 111a . . . 111n. The data distributor provides means whereby a single mode fiber loop 50 functions as a data bus to transmit signals between a device, such as a central processing unit 67, connected to or coupled to the fiber 50 and peripheral equipment such as terminals 72, 74, 76, and 78 used with the central processing unit 67. The terminals 72, 74, 76, and 78 may be conveniently connected to or optically coupled to corresponding fibers 111a, 111b, 111c, 111d. FIG. 19 shows four terminals 72, 74, 76, and 78 for convenience of illustration only. In actual practice, any desired number of peripheral units or other devices may be connected to the individual fibers 111a ... 111n.

As shown in FIG. 19, any signal which CPU 67 supplies to the fiber 50 will be coupled to all of the individual fibers 111 and supplied to any peripheral units connected thereto. Therefore, it may be preferable that each of the terminals 72, 74, 76, and 78 be responsive only to a particular address code. For example, when the terminal 72 receives the address code to which it responds, then terminal 72 will respond in a predetermined fashion to subsequent signals output from CPU 67. The terminal 72 supplies to the fiber 111a data signals which are then coupled to the fiber 50. After data signals from the terminal 72 are coupled to the fiber 50, the data signals are then coupled to each of the subsequent individual fibers 111b ... 111n. Thus, a signal output from the CPU 67 may cause the transfer of data between the terminals 72, 74, 76, 78, or other peripheral equipment (not shown) used in connection with the CPU 67.

It will be recognized that the upper limitation on frequencies which may be filtered by a transversal filter using the above described tapped delay line is determined by the minimum length of the optical fiber 50 between tap locations. One way to increase the system-set fundamental frequency is to decrease the length L of the fiber 50 between tap locations. In FIG. 16, a device is shown which uses four of the tapped units described above. Since this in effect reduces the length L at which interval sampling of the signal occurs to L/4, the maximum frequency which may be measured is increased by a factor of four due to the proportionately-decreased time at which samples are taken.

The effect of using multiple tapped units is to shorten the delay time, which may be advantageous in a data distribution system. The structure of FIG. 16 permits the transfer of data from fiber 50 to the individual fibers 144, 1144, 2144, and 3144 of coupler arrays 80, 82, 84 and 86 respectively. It is possible, for example to transfer data along the fiber 50 to the individual fibers 1144 without the data signal first having to traverse all of the coils in the coupler array 80, thus providing a shorter delay time than if all the individual fibers 144, 1144, 2144 and 3144 were serially connected in a single coupler array. Accordingly each of the coupler arrays 80, 82, 84 and 86 may have fewer wraps than would be required in a data distribution system using only one such coupler array.

Weighting the outputs of a tapped delay line to vary the response of the system is performed by attenuating to some extent the outputs of selected individual taps. The weighting controls inherent in the tapped delay line of the present invention enable the fundamental frequency of the transversal filter to be varied to a fairly considerable extent by dropping a number of taps out completely to lower the fundamental frequency of the transversal filter. For example, by dropping every other tap by weighting these taps at zero, the fundamental frequency is halved. Another advantage of the ability to weight each tap individually is that loss in signal strength near the end of the tapped delay line may be compensated for by the weighting controls.

The weighting controls also allow the passband of a filter to be tailored; for example, in a transverse filter, the passband may be sharpened and narrowed so that it is nearly rectangular rather than only a relative approximation of a rectangular passband with harmonics. If the taps are weighted equally (or not weighted at all), the frequency response of the device is $|\sin(x)/x|$, as shown in FIG. 17. The fundamental frequency is centered at $f_o$, with the passband being between $-\pi$ and $+\pi$ from the fundamental frequency $f_o$.

Since it is desirable to obtain a more rectangular passband and to eliminate the side frequency nodes, weighting of the taps is desirable. In FIG. 18, the preferred weighting of a 67-tap tapped delay line using FETs 192 to provide the weighting is described by a graph showing the weighting of the 67 taps. The center tap 200 is not weighted at all, so the entire electrical signal from the photodetector 140 is passed by the FET 142 to the summing device 25. The taps to each side of the center tap 200 are weighted by the FET 142 for each tap to the extent indicated by FIG. 18, with the amount each line representing a tap is diminished from 1.0 being the amount of attenuation given to that particular tap. This weighting will produce the desired more nearly rectangular passband.

If a greater number of taps are weighted in the area between B and C in FIG. 18, the passband will become more and more narrow, centered on the fundamental frequency determined by the length L between taps. Alternatively, if fewer taps are weighted in the B to C curved area, the passband is wider.

The shape of the passband is determined by the number of taps used in a weighting function approximating the side nodes, three of which are shown on each side of the center curve (B to C), these nodes being the A to B and C to D areas. Generally, the greater the number of these side nodes that are produced by weighting the taps, the sharper and more rectangular will be the passband. Thus, it can be seen that passbands of various shapes may be custom-tailored using various weighting functions on the taps.

The advantages of the present invention over earlier tapped delay lines are impressive. The optical tapped delay line is operable at frequencies much higher than are wave phenomena devices or electrical devices. The device is not subject to electromagnetic interference. Probably the most notable advantage of this tapped delay line is that a relatively large number of identical optical taps may be quickly, conveniently, and inexpensively constructed in a single compact unit.

Since each of the taps only removes a very small portion of the signal, the number of effective taps which may be obtained is considerably higher than that of a recirculating type tapped delay line transversal filter. The ability to custom tailor the outputs by using the weighting controls allows the precise shape of the passband to be made into an accurate shape with the desired frequency characteristics. Finally, the v-groove-silicon chip technology disclosed allows identical coupling devices to be manufactured in large quantities for commercial sale.

What is claimed is:
1. A fiber optic data distribution system, comprising:
a first array of portions of a single, continuous, single mode optical fiber;
means for supplying an optical signal to said first array;
a second array of elements for carrying optical signals;
means for holding said first array of portions of said single continuous fiber in alignment with said second array so that light propogating in either one of said first and second arrays is coupled to the other of said first and second arrays; and means optically coupled between selected elements of the second array for receiving optical signals coupled from the first array through a first of said selected elements and for selectively transmitting optical signals onto a second of said selected elements for coupling said selectively transmitted optical signals onto the first array, such that a portion of the selectively transmitted optical signals is optically coupled to a third of the selected elements.

2. A fiber optic data distribution system according to claim 1 wherein evanescent field coupling couples light between said first and second arrays.

3. A fiber optic data distribution system according to claim 1 or claim 2 wherein said first array comprises portions of fiber optic material from which a part of the cladding has been removed.

4. A data distribution system according to claim 3 wherein said second array comprises a plurality of portions of separate single mode, optical fibers from which a part of the cladding has been removed.

5. A fiber optic data distribution system according to claim 1 wherein the means optically coupled between the selected elements comprise a peripheral device which provides optical output signals in response to signals received from the first selected element.

6. A fiber optic data distribution system according to claim 1 wherein said second array of elements comprise a plurality of single mode optical fibers.

7. A method of distributing optical signals propogating in an optical fiber, comprising the steps of:
  forming a first array of portions of a single, continuous, single mode optical fiber;
  forming a second array of segments of a plurality of separate, single mode optical fibers;
  holding the first and second arrays in alignment so that evanescent field coupling couples light from each of the first and second arrays to the other of said first and second arrays;
  supplying optical power to the first array for distribution to the plurality of separate fibers in the second array by means of evanescent field coupling;
  providing a portion of the optical power through a first selected one of said segments to an optically responsive device which is coupled to said first selected segment;
  providing an optical signal from said optically responsive device in response to optical power provided to said device; and
  transmitting the optical signal from said device onto a second selected one of said segments for coupling the optical signal onto the first single mode fiber, such that a portion of the optical signal is optically coupled to a third selected one of the segments.

8. A method of distributing optical signals according to claim 7 further comprising the step of polishing the first and second arrays to remove a part of cladding from the first and second arrays.

9. A fiber optic data distribution system, comprising;
  a first single mode optical fiber;
  a plurality of single mode optical fiber segments optically coupled to the first optical fiber, providing an optical path between said first fiber and each of said optical fiber segments to cause a portion of an optical signal transmitted in any of said first fibers and said fiber segments to be coupled between the first optical fiber and at least one of the plurality of optical fiber segments; and
  means optically coupled between selected ones of the optical fiber segments for receiving optical signals coupled from the first optical fiber through a first of the selected optical fiber segments and for selectively transmitting optical signals onto a second of the selected optical fiber segments for coupling said selectively transmitted signals onto the first optical fiber, such that a portion of the selectively transmitted optical signals is optically coupled to a third of the selected optical fiber segments.

10. A fiber optic data distribution system as defined in claim 9, wherein the means optically coupled between selected optical fiber segments comprises a peripheral device which provides optical output signals in response to signals received from the first selected optical fiber segment.

11. A fiber optic data distribution system as defined in claim 9, further comprising a device optically coupled to the first optical fiber for transmitting optical signals into the first optical fiber.

12. A fiber optic data distribution system as defined in claim 11, wherein the device for transmitting optical signals comprises a central processing unit which receives and transmits optical signals through the first optical fiber, thereby accomplishing two-way data transmission between the central processing unit and the means optically coupled between selected optical fiber segments.

13. A method of distributing optical signals propogating in an optical fiber, comprising the steps of:
  providing a first single mode optical fiber;
  coupling a portion of a first optical signal between the first optical fiber and at least one of a plurality of single mode optical fiber segments;
  optically coupling said portion of the first optical signal through a first selected one of the optical fiber segments to an optically responsive device;
  selectively coupling a second optical signal from the optically responsive device into a second selected one of the optical fiber segments in response to the optically coupled portion of the first optical signal; and
  coupling said second optical signal onto the first optical fiber, such that a portion of the second optical signal is optically coupled to a third selected one of the optical fiber segments.

14. A method of distributing optical signals as defined in claim 13, further comprising the step of receiving and transmitting optical signals from a central processing unit through the first optical fiber, thereby accomplishing two-way data transmission between the cental processing unit and the optically responsive device.

* * * * *

REEXAMINATION CERTIFICATE (1303rd)
United States Patent [19]

Newton et al.

[11] B1 4,511,207

[45] Certificate Issued  Jun. 12, 1990

[54] FIBER OPTIC DATA DISTRIBUTOR

[75] Inventors: Steven A. Newton, Menlo Park, Calif.; John E. Bowers, Milltown, N.J.

[73] Assignee: The Board of Trustees of Leland Stanford Jr. Univ., Stanford, Calif.

Reexamination Request:
No. 90/001,861, Oct. 10, 1989

Reexamination Certificate for:
Patent No.: 4,511,207
Issued: Apr. 16, 1985
Appl. No.: 416,667
Filed: Sep. 10, 1982

Related U.S. Application Data

[63] Continuation-in-part of Ser. No. 323,038, Nov. 19, 1981.

[51] Int. Cl.$^5$ .............................................. G02B 5/14
[52] U.S. Cl. .............................. 350/96.15; 250/227; 350/96.16
[58] Field of Search ............... 250/227; 350/96.15, 350/96.16, 96.19, 96.20, 96.29, 96.30

[56]  References Cited

U.S. PATENT DOCUMENTS 4,234,969 11/1980 Singh .................................. 455/607
4,307,933 12/1981 Palmer et al. ..................... 350/96.16
4,315,666  2/1982 Hicks, Jr. ......................... 350/96.15

FOREIGN PATENT DOCUMENTS 2930454 12/1981 Fed. Rep. of Germany .

OTHER PUBLICATIONS

"An Engineering Guide to Couplers," by Joseph C. Williams and Frederick T. McDuffee, Fiberoptic Technology, pp. 129–134 (Oct. 1981), Laser Focus, vol. 17.

*Primary Examiner*—John D. Lee

[57] ABSTRACT

A fiber optic data distributor utilizes a one-by-n single mode optical fiber directional coupler to distribute data from a single fiber to a plurality of separate fibers. The separate fibers may supply data from a central processing unit to peripheral units, which may also input data to the separate fibers for transmission to the central processing unit.

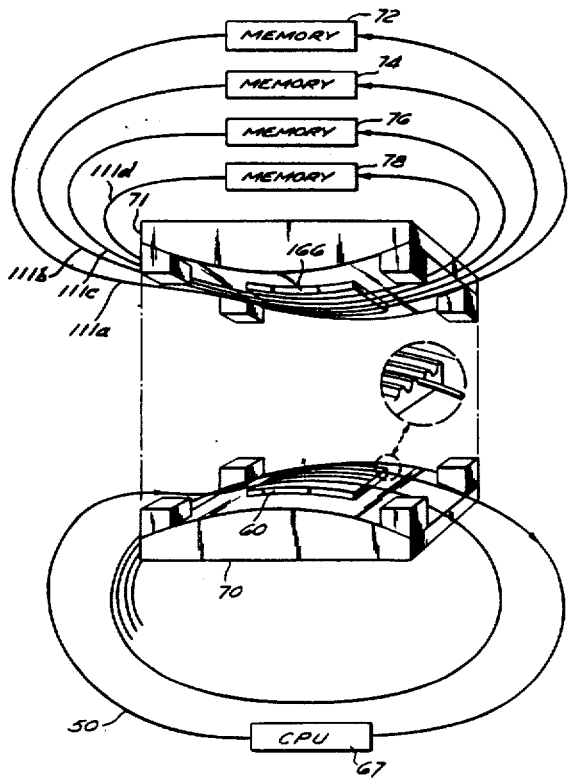

REEXAMINATION CERTIFICATE ISSUED UNDER 35 U.S.C. 307

NO AMENDEMENTS HAVE BEEN MADE TO THE PATENT

AS A RESULT OF REEXAMINATION, IT HAS BEEN DETERMINED THAT:

The patentability of claims 1-14 is confirmed.

* * * * *